July 6, 1926.

G. E. ETHERTON

STENOGRAPHIC TYPEWRITER

Filed July 7, 1921

Inventor.
Guy E. Etherton.
By Alfred H. Daehler,
His Attorney.

July 6, 1926.

G. E. ETHERTON 1,591,299

STENOGRAPHIC TYPEWRITER

Filed July 7, 1921

Inventor.
Guy E. Etherton.
By Alfred H. Daehler,
His Attorney.

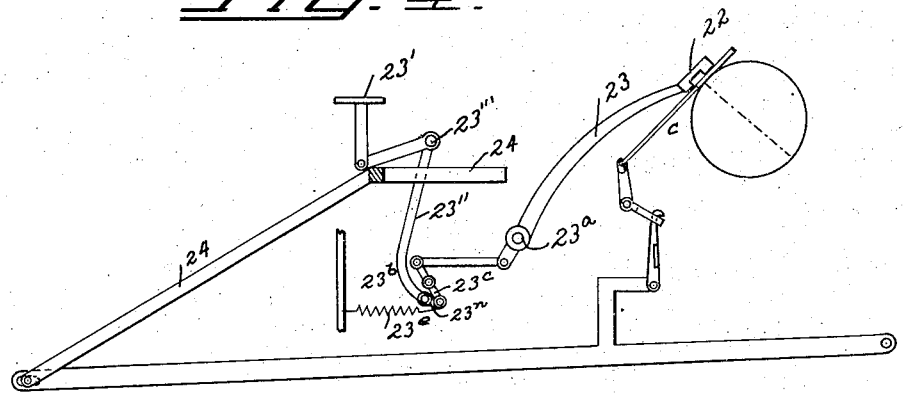
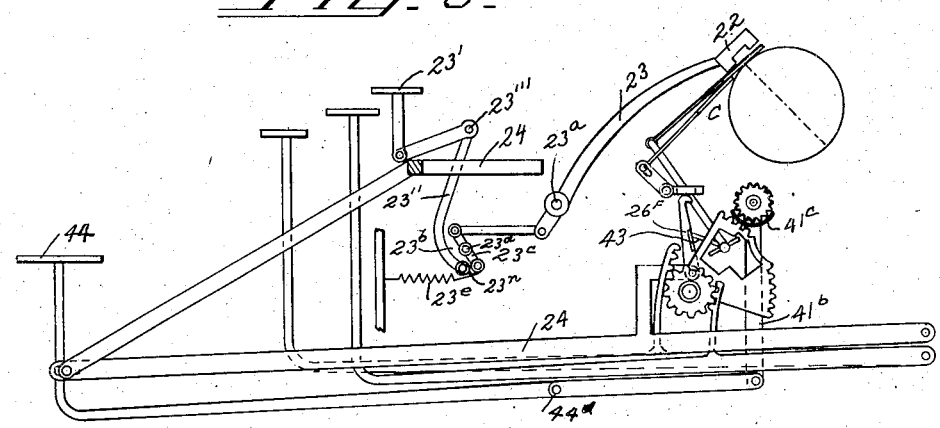
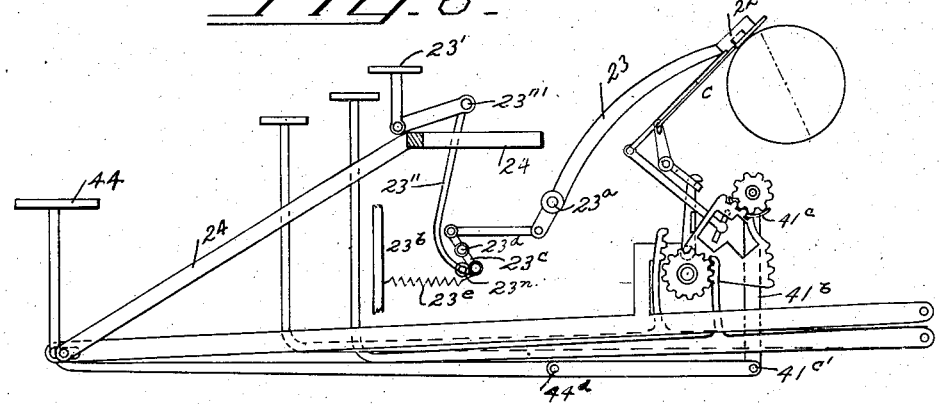

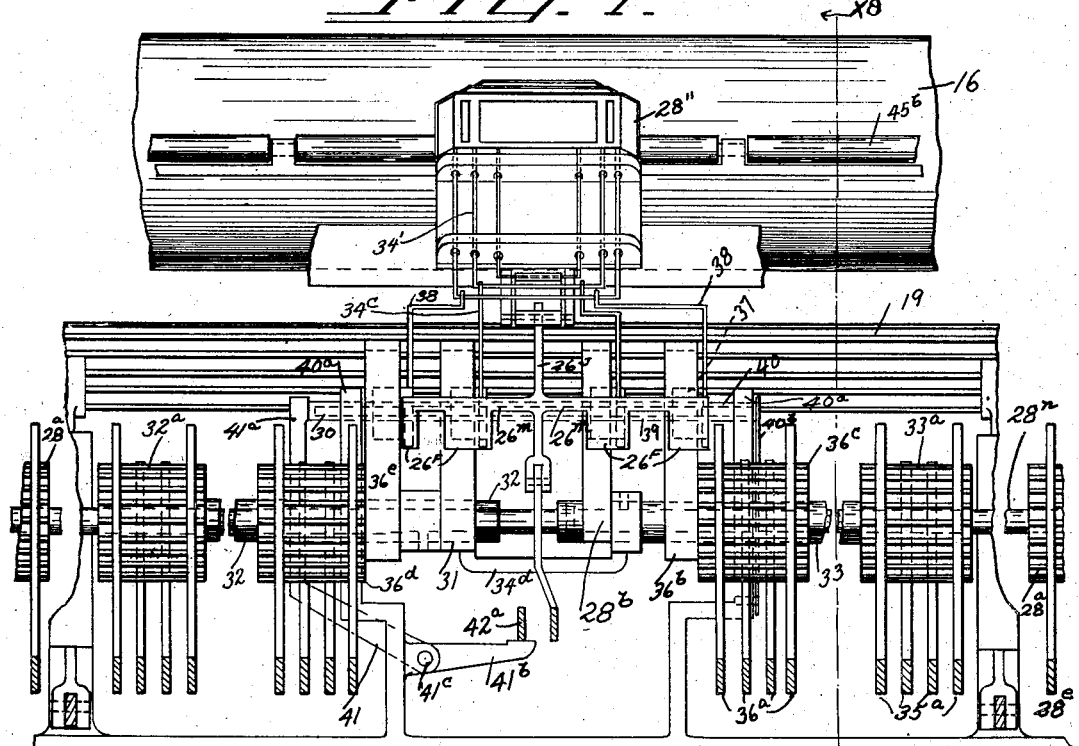

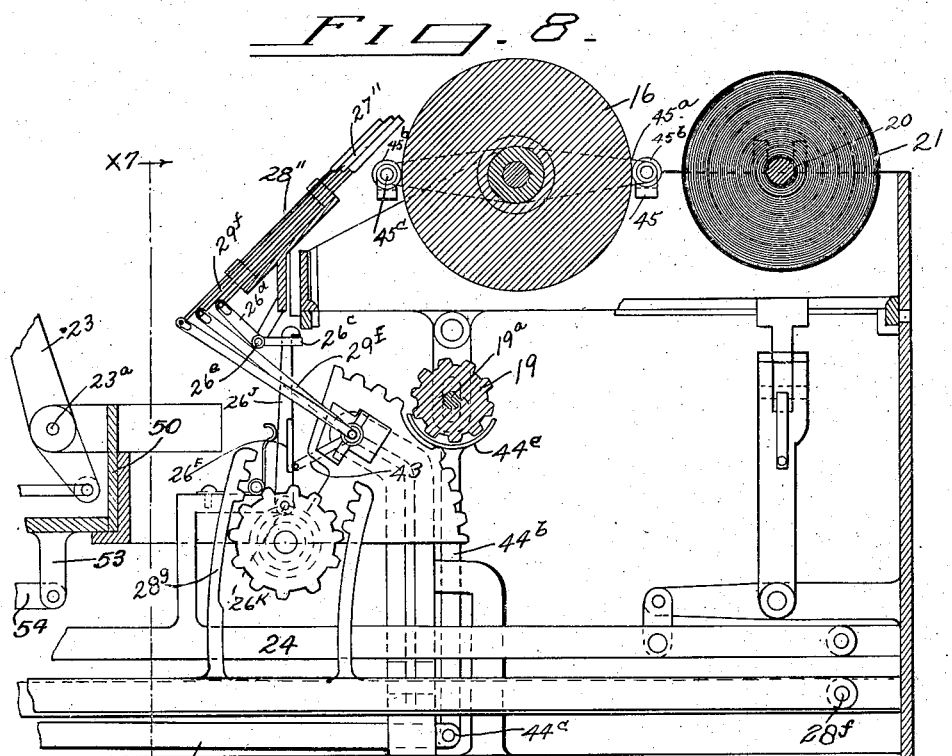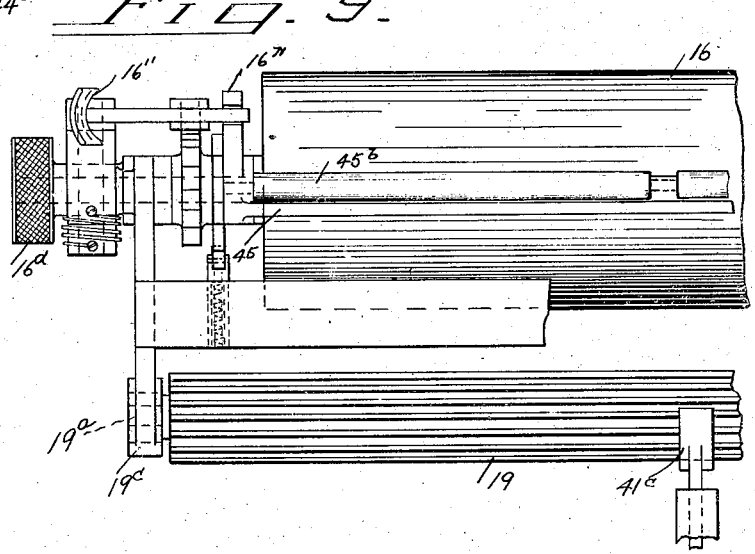

July 6, 1926.
G. E. ETHERTON
1,591,299
STENOGRAPHIC TYPEWRITER
Filed July 7, 1921    6 Sheets-Sheet 6
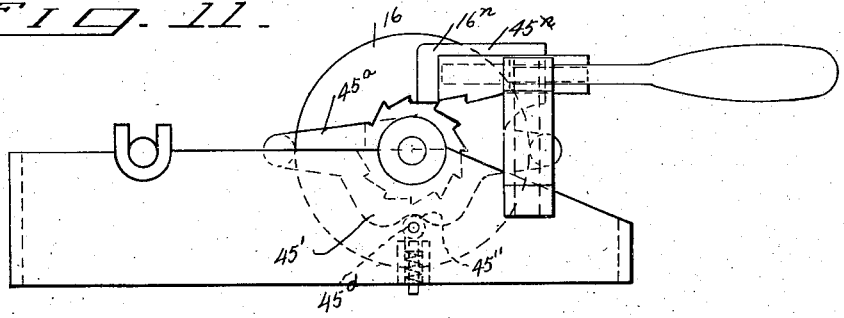
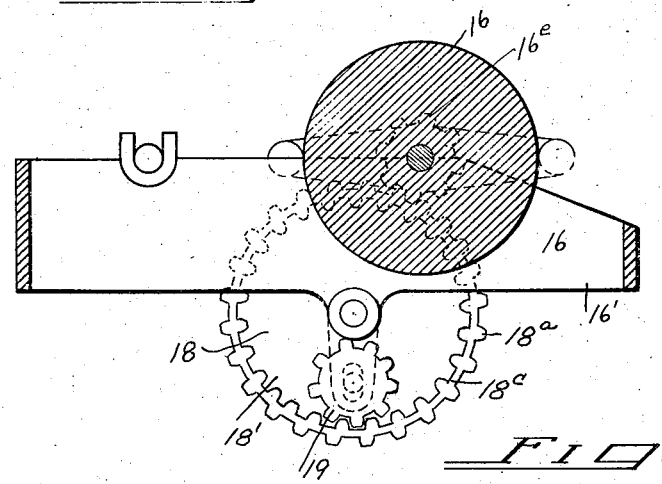
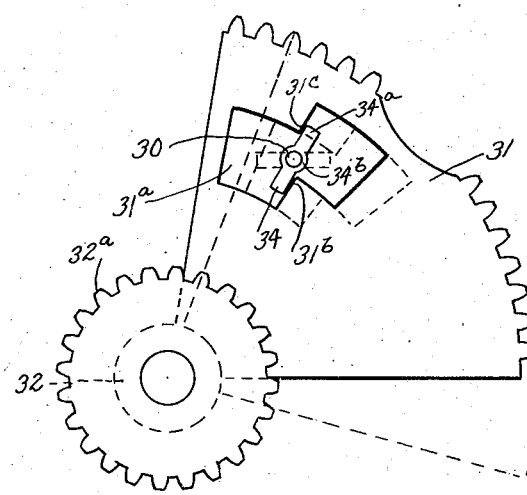
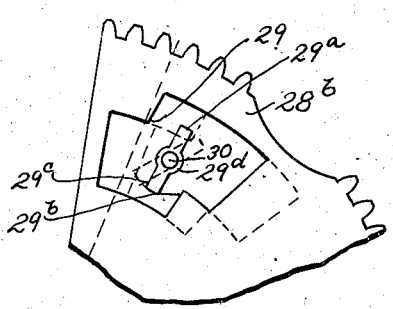
Inventor.
Guy E. Etherton.
By Alfred H. Daehler,
His Attorney.

Patented July 6, 1926.

1,591,299

UNITED STATES PATENT OFFICE.

GUY E. ETHERTON, OF LOS ANGELES, CALIFORNIA.

STENOGRAPHIC TYPEWRITER.

Application filed July 7, 1921. Serial No. 483,021.

This invention relates to stenographic typewriters, and it has for its object to provide a typewriter whereby an operator may produce stenographic or other records and the like and particularly whereby the symbolizing power of the characters employed may be greatly increased.

In accordance with the invention, and in the preferred practice thereof, I provide a typewriter which may have the usual or conventional type of paper supporting and feeding mechanism or means, spacing means, standard ribbon feeding means, and in fact which may have many of its parts, and particularly such parts as an embodiment of the invention and an ordinary typewriter both require constructed and organized in the conventional manner; or in practicing the invention, these parts may be specially designed in accordance with the preference of the designer. However, in addition to, and harmoniously working with, such parts, corresponding to parts found in various makes of typewriters, I preferably provide means for supplying inks of a plurality of readily distinguishable colors, in substitution for the means for supplying the black or other colored "standard" ink, which will hereinafter be referred to as the "base color", to the end that any of the type characters may be produced or imprinted upon the paper in any of the plurality of colors provided for in the inking means; furthermore, means are provided, whereby the type characters may be produced or imprinted in a plurality of zones or positions other than the normal or usual base line or aligned position of the characters imprinted or otherwise produced upon the paper, which usual aligned position will hereinafter be referred to as the "base position"; such other positions correspond to zones of the paper parallel to the normal or "base position" but spaced therefrom, some above such base position, and some below the same. In the form of the invention shown in the drawings, variable or shiftable relation of paper and character type printing zone is provided for by means or mechanism whereby the paper-supporting rotatable platen may be rotated with the paper thereon, in either direction to cause the selected character type, the operating devices of which somewhat resemble those ordinarily employed in typewriters, to print on surfaces of the paper either above or below the normal or base line or position according to the direction of platen rotation.

By the provision of a plurality of controlling keys for each of the colors in which the characters are to be printed, other than the base color, and having a color controlling key of each of such color also arranged to control the position of the platen during the printing action of a type character, an operator is enabled to strike, practically at the same time, a character printing key, so, instantly, by selective actuation of two keys, changing the symbolizing value of the character selected, by causing the imprinting of the same in a selected color other than the base color, and in a zone or position other than the base position, in which latter color and latter position the character may be printed by depressing the character key only.

Means are provided for interfering with or interrupting the operation of the connections between such color and position controlling keys for either the purpose of preventing the imprinting of the type character in the color corresponding to the color key depressed, and so permit of the use of such key as a position selecting key only, while the character key selected for actuation therewith causes the character selected to be imprinted in the base color in the position corresponding to the selected color and position key, or for interfering with or interrupting the action of the operative connections which cause the paper-shifting means to operate. By employing such means to prevent the operation of the paper-shifting means, the selected character may be imprinted in the selected color in the base position upon operation of the selected character key, a color key, and the proper controlling key comprised within such means.

In the form illustrated and described herein the invention provides a combined stenotype and typewriter, the character type mechanism and controlling keys therefor providing for phonetic recordation, when the device is used as a stenotype, and the transcribing of notes so made or the typewriting of other matter when used as a typewriter.

A further object of the invention is to provide a device of the character disclosed which will be relatively simple and inexpensive in construction and organization, when its advantages such as ease of operation, convenience in use, freedom from liability to get out of order or repair, dependability, and general superiority in service are considered.

With the above and other objects in view, the invention consists in the novel and useful provision, formation, combination, association and relative arrangement of parts, members and features, all as hereinafter described, shown in the drawings, and finally pointed out in claims.

In the drawings:

Figure 4 is an enlarged diagrammatic view illustrating the action of parts of the device;

Figure 5 is an enlarged diagrammatic view illustrating the action of parts of the device;

Figure 6 is an enlarged diagrammatic view illustrating the action of parts of the device;

Figure 7 is a longitudinal sectional view taken on the line $x^7$—$x^7$, Figure 8, and looking in the direction of the appended arrows;

Figure 8 is a transverse vertical sectional detail view taken on the line $x^8$—$x^8$, Figure 7, and looking in the direction of the appended arrows;

Figure 9 is a fragmentary plan view of the platen and associated parts at the left hand end thereof;

Figure 10 is a fragmentary plan view of the platen and associated parts at the right hand end thereof;

Figure 11 is an end view of the left hand end of the carriage;

Figure 12 is a vertical sectional view through the carriage;

Figure 13 is a fragmentary view of one of the platen adjusting sectors with associated parts;

Figure 14 is a similar view of another platen-adjusting sector with associated parts; and Figure 15 is a face view of a fragment of an inking ribbon adapted for use or forming part with the device.

Figure 1:
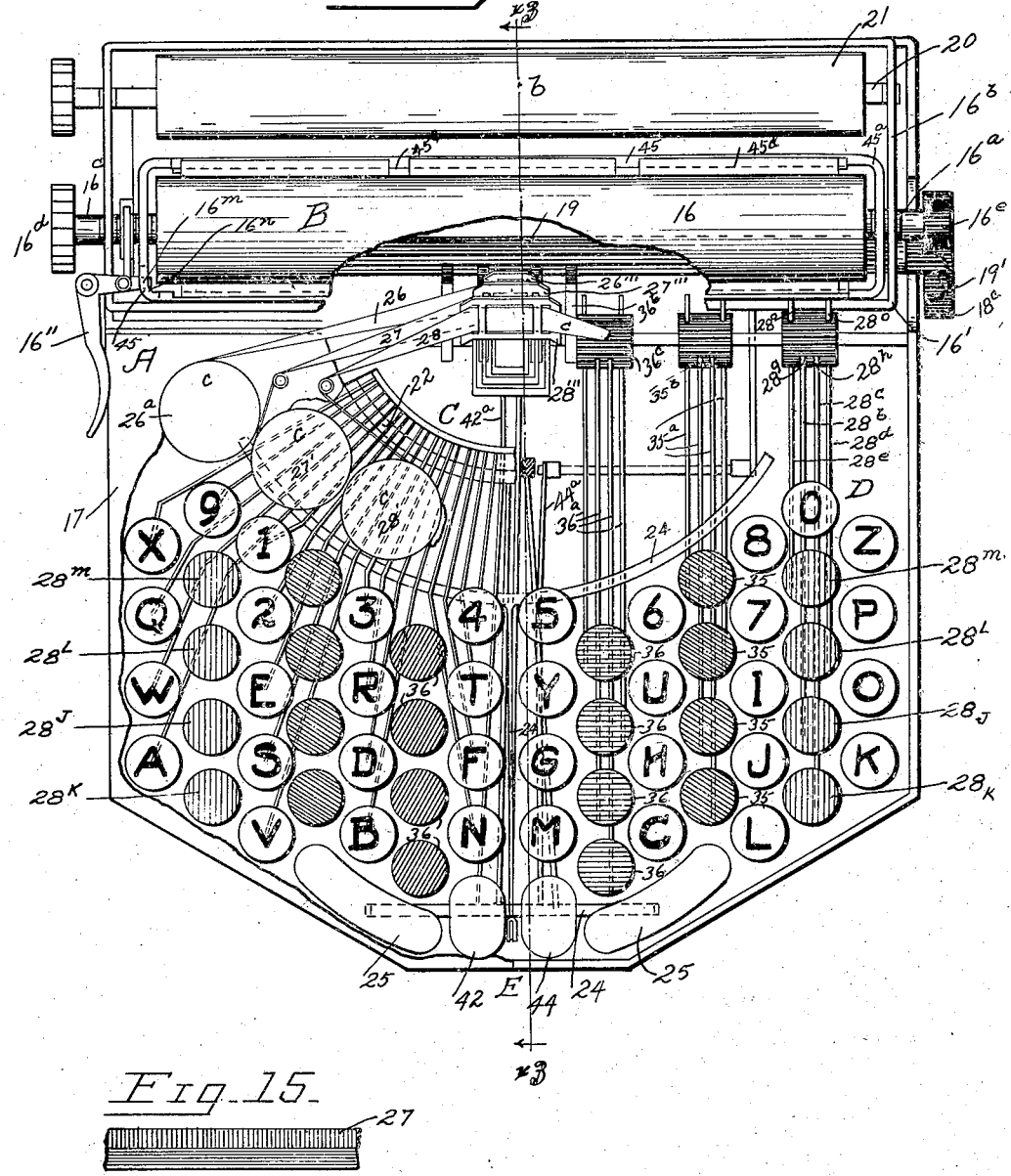
Figure 1 is a fragmentary view of a combined stenotype and typewriter constructed and organized to embody the invention.

Referring with particularity to the drawings, in the embodiment of the invention therein shown, A designates, generally, the frame and mechanism of a stenographic typewriter embodying many usual typewriter features, such as paper supporting and feeding means, character spacing mechanism, and like devices, as well as embodying special features coacting therewith, B designates the shiftable paper supporting means, C designates means for imprinting a type character upon a sheet of paper or the like, D designates, broadly, means whereby an operator may cause the actuation or operation of the printing means C and whereby characters may be imprinted in a plurality of positions and in any of such positions in any color selected from the plurality of colors provided for in the printing means, and E designates means for interfering with or preventing the functioning of elements of the means D.

The shiftable paper supporting means B is shown as comprising a rotatable platen 16 journalled as at 16$^a$ in a carriage 16$^b$ slidably mounted upon the main frame 17 in the usual manner. At one of its ends the shaft 16$^c$ of the platen 16 is provided with a finger piece 16$^d$ and at its other end such shaft 16$^c$ is provided with a gear 16$^e$ which meshes with external teeth 18$^a$ of a gear 18 rotatably mounted upon a short shaft 18$^b$ supported by the end member 16′ of the carriage 16. This gear 18 has an annular portion 18$^c$ on which the teeth 18$^a$ are provided and such annular portion has teeth 18$^d$ provided internally thereof; such annular gear portion 18$^c$ is joined to the gear hub 18$^e$ by a wall 18′. A long spur pinion 19 having a reduced shaft or bearing portion 19$^a$ at its one end and a reduced shaft or bearing portion 19$^b$ near its other end is rotatably journalled at such bearing portions 19$^a$ and 19$^b$ in the lower portions of the carriage end walls as at 19$^c$ and 19$^d$. At the journal bearing 19$^d$ and outwardly thereof the pinion portion 19′ is joined to the remaining or main portion 19″ of the pinion 19 by the journal 19$^b$ and is in mesh with the internal teeth 18$^d$ of the gear 18. A conventional type of spacing and carriage return device 16″ is shown at one end of the platen 16.

Paper supply means $b$ may be provided on the carriage behind the platen; such means $b$ is shown as comprising a shaft 20 adapted to support a rolled up strip or sheet of paper 21; the shaft 20 is received in suitable recesses one of which is provided in each end wall of the carriage 16$^b$.

The printing means C is shown as comprising a plurality of type characters 22, members 23 shown as type bars of conventional form, upon which said type characters are mounted, and inking means $c$. Each type bar 23 is mounted in the main frame 17 for rotation about the axis of its shaft 23$^a$ and is connected through suitable linkage 23$^b$ constituting means of operative connection or operating means with the corresponding controlling key 23′ comprised within the means D. Each linkage 23$^b$ comprises a two-armed lever 23$^c$ pivoted in the framework 17 as at 23$^d$. A contractile spring 23$^e$ extending from the lower arm of the lever 23^c to the framework 17 serves to keep the respective controlling key and type carrying member in its normally retracted position. Each character key 23' has a shank 23", which may be in the form of a bell crank, pivotally mounted in the framework as at 23'''. Each character key per se, is fixed to one arm of such bell crank 23''', and has its other arm connected by a link 23^n to the lower arm of the lever 23^c.

The universal bar 24 acting with its associated parts in the usual manner to step up the carriage in spacing action after each depression of a character key or a spacing key is formed to extend beneath all of the character key shanks and to a pair of spacing keys 25, one of which is shown as disposed in each half of the keyboard; upon depression of any character key, therefore, the universal or spacing bar is depressed and so set to act as an escapement for carriage spacing purposes after the imprinting of the character controlled by the depressed key and in the return stroke of such key.

The inking means $c$, in the preferred form of the invention, comprises an inking ribbon 26 of standard color, for instance black, which may constitute the "base" color, together with the conventional type of ribbon feeding means comprising alternately driven right and left hand ribbon spools 26^a, and such inking means further comprises a plurality of bichrome ribbons 27 and 28 each of which is mounted upon its own feeding means, comprising alternately driven right and left hand ribbon spools 27' and 28', respectively. Each of these bichrome ribbons may have its upper portion of one color and its lower portion of another color, as will be understood by reference to Figure 15. The ribbons 26, 27 and 28 are each normally held out of the printing zone, as below the same, by guides 26", 27" and 28", respectively. These guides 26", 27" and 28" may be of the standard or conventional type and comprise, respectively, guide frames 26''', 27''' and 28''' and operating devices for moving the guide frames, through which the ribbons are passed, into and out of the printing zone, as determined by the controlling keys. The guide frame 26''' of the black ribbon 26 is shown as connected to one arm of a bell crank device 26^d pivotally mounted at 26^e in the frame work, the other arm of the bell crank device 26^d having a horizontal extension 26^o adapted to be caught and pulled downwardly by a spring-pressed hook 26^j pivotally connected to the universal bar as at 26^k. A horizontal extension 26^m having a plurality of depending spaced contact pieces 26^f is formed on each side of the hook 26^j each in a position to be engaged by a finger provided on features of the colored ribbon operating devices, in order that the hook 26^j may be pressed out of its bell crank engaging position when a colored ribbon is operated to be moved into the printing zone, so to render the black ribbon inoperative.

The devices for moving the colored ribbon, or either of the colors of the colored ribbons to the printing zone may be constructed as follows:

A horizontal shaft 28^n is rotatably journalled in the framework at its ends and near each end has a spur gear 28^a secured thereto; a sector 28^b is likewise secured to such shaft 28^n. Four key shanks 28^b, 28^c, 28^d and 28^e are provided at each side of the typewriter and have their inner ends pivotally connected to the framework as at 28^f. The key shanks 28^b and 28^c are each provided with an upstanding curved sector-operating rack, 28^g and 28^h, respectively, at the front of the respective gears 28^a, and the key shanks 28^d and 28^e are each provided with a curved sector-operating rack 28^o at the rear of the respective gear 28^a. Keys 28^j, 28^k, 28^l and 28^m, comprised within the means D, are provided on outer ends of the key shanks 28^b', 28^c, 28^d' and 28^e, respectively. It will thus be seen that upon depression of a key 28^j, the sector 28^b will be moved to rotate the long spur pinion 19 with which it normally meshes in such direction that the platen geared thereto as hereinbefore described will be rotated to advance the paper to the first position above the base position, the stroke of the key being limited in its travel to so hold the platen as long as the key is in depressed position; upon depression of a key 28^k the platen will be rotated to bring the second position of the paper above the base position into the printing zone. A key 28^l when depressed will move the platen in the opposite direction one step and a key 28^m when depressed will move the platen two steps in such opposite direction, due to the opposite positioning of the racks of the keys 28^l and 28^m. These keys 28^j, 28^k, 28^l and 28^m are indicated on the key board as red, that being the color normally controlled thereby, the red and green bichrome ribbon being passed through the guide 27" and such guide 27" being actuated or moved only one-half of its full distance of travel by the red keys, and the full distance by the green keys, so bringing the proper ribbon portion into the printing zone. In Figure 13 the "red" sector 28^b is shown and such sector has a "lost motion" slot and is formed with a contact portion at each side of the slot, one such contact portion 29 being adapted to strike an upwardly ranging finger 29^a of the corresponding ribbon positioning device, another such contact portion 29^b being adapted to strike a downwardly ranging finger 29^c of such ribbon positioning device. The ribbon positioning device further comprises a hub 29$^d$ rotatably mounted upon a slidable shaft 30 in the framework, and an arm 29$^e$ projecting from the hub 29$^d$ and connected by a link 29$^f$ to the ribbon guide 27″.

The green ribbon portion is moved into the printing zone by means of a device constructed similarly to the device just described but the "lost motion" slot is eliminated or reduced, and such device comprises a sector 31 fixed to a tubular shaft 32 arranged concentrically to the axis of the shaft 28$^m$ and rotatably mounted thereon, a spur gear 32$^a$ fixed to such shaft 32, a further tubular shaft 33 at the opposite side of the typewriter and mounted similarly to the shaft 32, a spur gear 33$^a$ on such shaft 33, and a device having a depending finger 34 and an upstanding finger 34$^a$ fixed to a hub 34$^b$ rotatably mounted upon the shaft 30. The sector has a slot 31$^a$ and is formed with a lower contact portion 31$^b$ adapted to engage the depending finger 34 and an upper contact portion 31$^c$ adapted for contact with the upstanding finger 34$^a$. An arm 34$^c$ extends from the hub 34$^b$ and is connected by a link 34′ to the ribbon guide 27″. A yoke 34$^d$ connects the sector 31 and the tubular shaft 33 so uniting these parts for joint rotation. A set of four "green" keys 35 is provided at each half of the keyboard and the shanks 35$^a$ of two of these green keys of each set have racks 35$^b$ meshing when actuated with the long spur gear or pinion 19 forwardly thereof, while the shanks 35$^a$ of the other two keys 35 of each set have racks meshing when actuated with the long spur gear 19 at the rear thereof, so providing for actuation of the gear 19 and the platen geared thereto one or two steps in either direction from the base line or position according to which key of either set is pressed. These green key shanks 35$^a$ are pivoted in the framework at their inner ends. The "lost motion" being eliminated in the sector 31, the arm carried by the hub 34$^b$ immediately begins to move upon sector movement through any one of the "green" controlling keys, due to the turning of the hub caused by one of the fingers 34 or 34$^a$ being struck by the respective contact portion of the sector so causing the arm to be moved upwardly in either direction of sector movement; in the case of the "red" sector, however, the "lost motion" provided for in the formation of the slot therein permits a certain amount of sector movement, corresponding to one half of the total ribbon width before the finger device is rotated to move the ribbon upwardly to the printing zone. This results in ribbon movement upwardly only to the extent required to bring the red portion of the ribbon into the printing zone. In the case of both forms of sectors, after the ribbon has been positioned, the slot formation permits of further movement of the sector in platen rotating action, to the extent determined by the key depressed, each key of each set, rotating the platen to a different position either due to the direction of rotation or the difference in sector travel and consequent travel of connected parts.

Inwardly of the two rows of green keys 35 of the means D, two further rows of color controlling keys 36 are provided and the shanks 36$^a$ of such keys 36 are pivotally mounted in the framework behind the long pinion, in the same manner that the shanks of the other controlling keys are mounted. One set or row of such keys is shown as purple and the other row or set as blue. A sector 36$^b$ is rotatably mounted upon the tubular shaft 32 and connected with a gear 36$^c$ also rotatably mounted upon such shaft 33; each blue key shank 36$^a$ has a rack in mesh when actuated with the gear 36$^c$; and each purple key shank 36$^a$ has a rack meshing when actuated with a gear 36$^d$ rotatably mounted upon the tubular shaft 33 and connected to a sector 36$^e$ also rotatably mounted upon such tubular shaft 33. Mounted upon the shiftable shaft 30, are a plurality of hub arm and finger devices 37, one being organized and operated as to slot and finger contacts similarly to the red controlling-sector 28$^b$, and the other being organized and operated similarly to the green controlling sector 31, so in the case of one color controlling sector 36$^b$, or 36$^e$, the "lost motion" in the sector slot before ribbon actuation permits of the use of a bichrome ribbon comprising the blue and purple sections in the guide 28″. It will be understood that upon actuation of any key 36 of either the blue or purple set of keys, the corresponding ribbon section or portion will be brought to the printing zone, as each finger, hub, and arm device 37, one of which coacts with each sector, 36$^b$ and 36$^e$, is connected through its arm to the guide 28″, by a link 38; these links 38 are connected with the guide 26, one near each side thereof. Spacing bushings 39 are provided on the slidable shaft 30 between the finger, hub and arm devices thereon, and bushings 40 are provided at each end of such shaft 30, the end bushings 40 being received in suitable bores in frame members 40$^a$. A spring 40$^b$ presses against one end bushing 40 and so normally holds the shaft 30 and the devices carried thereby at the extreme left position of their travel, and a bell crank lever device 41 has its vertical arm 41$^a$ bearing against the opposite end bushing 40 and its horizontal arm 41$^b$ underlying the shank 42$^a$ of a key 42 comprised within the means D. The bell crank device 41 is pivoted to the framework as at 41$^c$ so that when the key 42 is depressed the shaft 30 and devices carried thereby are moved to the right the operating devices being moved out of their respective sector planes and held in such position until the key 42 is released whereupon the flat spring 40ᵇ returns the parts to their normal positions; as each device carried by the shaft 30 has a hook engaging finger or lug 43 projecting from its hub, these lugs 43 are moved out of the zones of the depending contact pieces 26ᶠ of the black ribbon operating means, the arms being slidable with respect to their ribbon guides; upon actuation of any color key in conjunction with the key 42, which key 42 renders the lugs 43 inoperative by shifting the shaft 30 as described, the hook 26ʲ will act to raise the black ribbon 26 to the printing zone, the platen being shifted in a direction and through a distance corresponding to the position controlled by the key selected, so permitting the color keys to act as position keys only, the printing being in black in the position above or below the base position.

Figure 3:
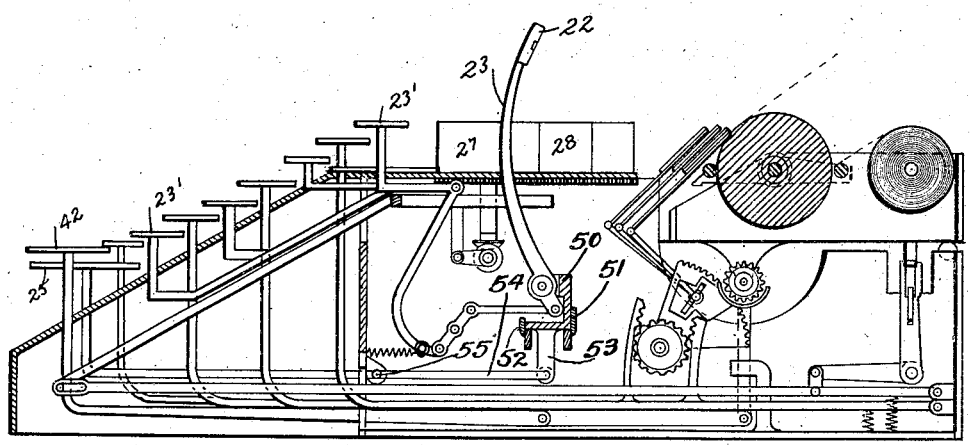
Figure 3 is a transverse vertical sectional view taken on the line $x^3$—$x^3$, Figure 1, and looking in the direction of the appended arrows.

Referring to Figs. 3 and 8, it will be seen that the type bar basket, designated 50, is adapted to be raised and lowered a short distance, between the guide members 51 and 52, by means of the member 53, connected to the end of a lever 54, pivoted in the frame, as at 55, thus making the usual provision for lifting the type bar basket to put the lower character on the type bar head in printing position.

In order to permit the printing of any of the characters in any of the colors selected in the base position, I preferably provide a key 44, comprised within the means D, and having a shank 44ᵃ pivoted near its inner end in the framework. This key 44 is adapted to lift the long platen rotating pinion or gear 19 out of mesh with the sectors as shown in Figure 5. A link 44ᵇ is provided at the end 44ᶜ′ of the key shank or lever 44ᵃ where it projects inwardly of the frame past its pivot 44ᵈ. Such link 44ᵇ has a chaneled or grooved member 44ᵉ thereon at its upper end and the member is adapted to be pressed against the under side of the pinion or gear 19 to lift the same a short distance when the key 44 is depressed, the pinion bearings in the carriage ends being arranged in a slot to this end. The member 44ᵉ may be plurally provided by bifurcating the inner end of the shank 44ᵃ.

In order to snugly hold the paper being printed upon to the platen 16, I preferably provide a frame 45, having end members 45ᵃ each of which is rotatably mounted upon the platen shaft, and having paper contacting or engaging pieces 45ᵇ mounted on each side member 45ᶜ thereof, these paper contacting pieces 45ᵇ being preferably approximately diametrically opposed with respect to the platen 16. One of the end frame members 45ᵃ has a cam surface 45′ at its under side, and such cam surface is notched as at 45″ to receive a spring-pressed detent 45ᵈ mounted upon the corresponding end wall of the carriage. By this interrelation of parts the paper engaging or holding means may follow the platen as the same is shifted in printing zone or position selecting action, and the same is normally positioned as shown in Figure 11; however, in rotating the platen to feed the paper and so present a new printing surface thereof or new base position extending transversely of the paper sheet or strip, the paper engaging means just described, being limited in its travel about the axis of the platen by the arrangement of the parts, can only follow the platen a short distance in its rotation, so remaining in its proper zone of operation.

The devices connected with the keys 42 and 44 constitute means E for interfering with or preventing the functioning of elements of the means D, the keys 42 and 44 being means of control therefor.

Figure 2:
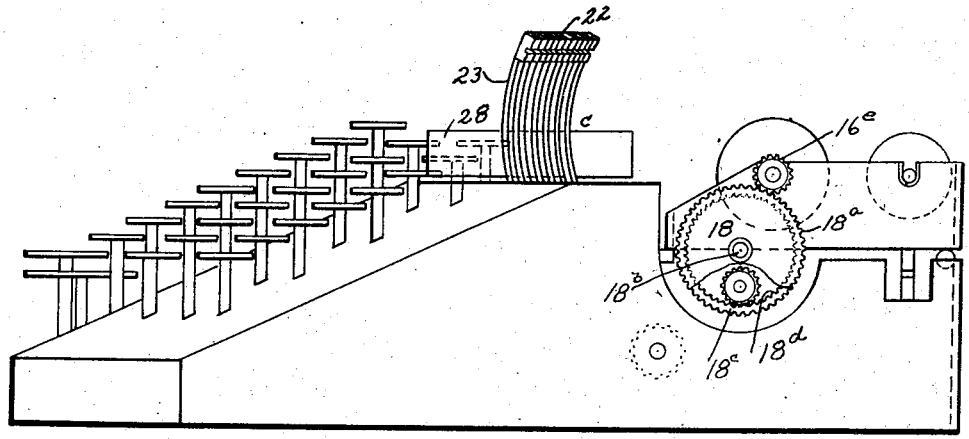
Figure 2 is a side elevation of the device shown in Figure 1 and looking in the direction of the large arrow near Figure 1.

The means D comprises a keyboard, in which the character keys 23′ are arranged, preferably in rows alternating with rows of "sets" of color keys ranging from the extreme front edge of the keyboard or means D toward the rearward edge thereof; the keyboard is preferably higher at the central portion, each succeeding row of keys toward both the right and left hand sides thereof being stepped down as shown in Figure 2 for convenience in manipulation. The entire keyboard arrangement is such that the right and left hand of the operator may be generally positioned over the right and left hand sections of the keyboard, it being only necessary for fingers of either hand to be moved to the opposite half or section of the keyboard to manipulate the purple or blue keys, as the case may be. As a series or set of both red and green color controlling keys are provided in each half of the keyboard, and as these red and green sets of keys, as well as the purple and blue sets of keys, alternate with rows of character keys, a character key and a selected color and position key may be simultaneously struck and depressed by fingers of one hand; furthermore, in addition to such simultaneous depression of a selected character key and a color key, either the color printing or the zone or position selection action of such selected color key may be interfered with or negatived by the practically simultaneous depression of the proper key of the keys 42 or 44, as the case may be.

In case the usual type characters including the letters of the alphabet are employed in the typewriter, for carrying out the stenotype method of short-hand writing, the device may be used as an ordinary typewriter by using such character keys and the standard typewriter features of the device only, and ignoring the combined color and positioning keys and other special stenotype features thereof.

The device 16'' has a finger 16^m which is moved into the path of a lug 16^n on the frame 45 when the device 16'' is operated, thus preventing the frame 45 from following the platen when the same is rotated in paper feeding action.

The operation, method of use and advantages of the invention will be readily understood from the foregoing disclosure, taken in connection with the accompanying drawings and the following statement.

Due to the systematic arrangement of the controlling keys of the keyboard, with regard to their arrangement for the performance of their special and coordinate functions and with regard to ease and celerity of operation, and the inter-related and interacting mechanisms and devices controlled thereby, a character may readily be printed on a sheet of suitable material in such a manner, and by a single instant and simultaneous stroke of controlling keys, as to give to the printed character any one of a plurality of its potential symbolizing values; by the use of only five colors and five positions, it will thus be seen, that the symbolizing value of the character is multiplied twenty-five fold.

It is to be noted that a different significance or symbolizing value is given to any of the characters by simultaneously depressing, at a single stroke, a single auxiliary key in conjunction with the respective character key.

The symbolic representation of human expression, whether in the recordation and discriminative exhibition of ideas, musical sounds, color tone effects, or other conceivable subject matter to be rapidly recorded or reproduced, is greatly facilitated by the employment of an embodiment of the invention equipped with suitable character type.

In addition to having a particular field of usefulness in the art of stenography, the invention is also especially useful in the music writing field.

I do not desire to limit myself to the specific embodiment of the invention herein disclosed, but reserve the right to vary the same, in practicing the invention, with respect to the mechanism, keyboard, number of colors and positions employed, and in other features, and all without departing from the spirit of the invention and the terms of the following claims.

Having thus disclosed my invention, I claim and desire to secure by Letters Patent:

1. In a device of the character disclosed, a platen, a type-carrying member, inking means comprising means for supplying inks in a plurality of colors, and means for simultaneously rotating said platen and actuating inking means features with respect to color selection and operating the type-carrying member to cause the imprinting of a character thereof in the selected color in a position other than a base position on a sheet of suitable material rotatable with said platen; said last named means comprising a color-shift key and a key for operating said type-carrying member.

2. In a device of the character disclosed, a platen, a type-carrying member, inking means comprising means for supplying inks in a plurality of colors, and means for simultaneously rotating said platen and actuating inking means features with respect to color selection and operating the type-carrying member to cause the imprinting of a character thereof in the selected color in a position other than a base position on a sheet of suitable material rotatable with said platen; said last named means comprising a color-shift key and a key for operating said type-carrying member; said color-shift key being disposed adjacent to said last named key to facilitate the simultaneous actuation of said keys.

3. In a device of the character disclosed, a rotatable platen, inking means comprising means for supplying inks in a plurality of colors, a plurality of character imprinting devices, a plurality of color selection keys for each of certain of the colors; and keys for operating the character imprinting devices; each of said color selection keys having means of operative connection whereby said platen may be rotated in printing zone determining action.

4. In a device of the character disclosed, inking means comprising means for supplying links in a plurality of colors, a set comprising a plurality of color selection keys for one of said colors, means of operative connection between each of said keys and corresponding features of the inking means, means for shiftably supporting a sheet of suitable material, a plurality of type characters, keys for operating said type characters, and means of operative connection between each of the color selective keys of said set and said sheet material supporting means whereby the printing zone on said sheet material is adjusted in accordance with the key of said set selected for actuation.

5. In a device of the character disclosed, inking means comprising means for supplying inks in a plurality of colors, a set comprising a plurality of color selection keys for one of said colors, means of operative connection between each of said keys and corresponding features of the inking means, means for shiftably supporting a sheet of suitable material, a plurality of type characters, keys for operating said type characters, and means of operative connection between each of the color selective keys of said set and said sheet material supporting means, whereby the printing zone on said sheet material is adjusted in accordance with the key of said set selected for actuation; and there being a key for preventing the action of said last named means of operative connection and whereby shifting of the printing zone on said sheet material upon color selection key actuation may be prevented.

6. In a device of the character disclosed, inking means comprising means for supplying inks in a plurality of colors, a plurality of sets of combined color selection and printing zone shifting keys, one of said sets of keys being provided for the selection of each of a plurality of colors, a plurality of type characters, a set of type character selection keys, sheet material supporting means, and means of operative connection for shifting the relative position of the printing zone of a sheet of material with respect to the type characters upon actuation of one of the color selection keys.

7. In a device of the character disclosed, inking means comprising means for supplying inks in a plurality of colors, a plurality of sets of combined color selection and printing zone shifting keys, one of said sets of keys being provided for the selection of each of a plurality of the colors, a plurality of type characters, a set of type character selection keys, sheet material supporting means, and means of operative connection for shifting the relative position of the printing zone of a sheet of material with respect to the type characters upon actuation of one of the color selection keys; and there being means for negativing the operation of keys of said sets in either shifting or color selecting action.

8. In a device of the character disclosed, inking means comprising means for supplying inks in a plurality of colors, a plurality of sets of combined color selection and printing zone shifting keys, one of said sets of keys being provided for the selection of each of a plurality of the colors and in each half of the keyboard, a plurality of type characters, a set of type character selection keys, sheet material supporting means, and means of operative connection for shifting the relative position of the printing zone of a sheet of material with respect to the type characters upon actuation of one of the color selection keys.

9. In means for increasing the symbolizing power of a character, a traveling carriage, a platen roller therein, printing means whereby said character can be imprinted upon suitable material, a character key for actuating said printing means for printing said character in a base position, and an auxiliary key for actuating said platen roller circumferentially to change the position of said printed character from said base position, and means actuated by said auxiliary key for causing said character to be printed in a selective color.

10. In a printing machine of the character referred to, in combination, a platen rotatably mounted, friction rollers for holding paper to turn with said platen, said friction rollers being mounted to have a limited bodily movement with the platen when the latter is rotated in either direction for a limited distance, key-actuated character printing bars, key-actuated ribbon vibrators for holding and guiding a plurality of ribbons of different colors, and key-actuated means for partially rotating said platen in either direction within the limit of a printing zone, and means whereby the simultaneous manipulation of two keys selectively determines the character printed, the color and its position, substantially as described.

11. In a printing machine, in combination, a platen, friction rollers movably mounted to bear thereagainst and movable about an axis concentric with the axis of said platen, means holding said platen in different positions circumferentially, means for turning said platen from printing zone to printing zone, means for turning said platen limited distances in either direction within the printing zone, whereby to print characters in different positions circumferentially of the platen within each printing zone, key-actuated printing means for printing characters on a sheet, key-actuated means for determining the color of the printed character, a plurality of different colored ribbons, and means whereby the actuation of two keys together selectively determines the character, the color and the position of the character printed in a printing zone, substantially as described.

12. In a printing machine of the character referred to, in combination, printing means, color and position determining means for the character printed, a key board including a plurality of character keys, and a plurality of combination color and position determining keys arranged among said character keys whereby to be actuated simultaneously therewith to determine the color and position of the character printed, substantially as described.

13. In a printing mechanism of the character referred to, in combination, means for printing characters, means for predetermining the positions of said characters, means for predetermining the colors in which said characters are to be printed, a key board for actuating said printing means, said key board including character printing keys, and combination position and color determining keys, said latter keys each being adapted to determine both the position and color of the character to be printed by the operation of the character printing keys and operable simultaneously therewith, substantially as described.

14. In means for increasing the symbolizing power of a character, a traveling carriage, a platen roller therein, printing means whereby said character can be imprinted upon suitable material, a key-board for controlling said printing means, said key-board including character controlling keys, color and position controlling keys, and means upon the actuation of a character controlling key, and an auxiliary key to cause said character to be imprinted in a selected color and in a predetermined position.

15. In a device of the character disclosed, a traveling carriage, a rotatable platen mounted therein and moving therewith, key-means for partially rotating said platen out of its normal position at will and for returning it when released, inking means comprising means for supplying inks in a plurality of colors, a plurality of character imprinting devices, a plurality of color selection keys for each of certain of the colors; keys for operating the character imprinting devices, and means whereby two selected keys simultaneously struck, selectively operates an imprinting device in a selected color and in a selected position.

16. Means for imprinting a character on a sheet of suitable material in a plurality of positions other than a base position, means for selectively supplying color for the imprint, and means for controlling both position and color of the imprinted character; said last named means comprising a single means for controlling a position and a color.

17. In a typewriting machine, in combination, a traveling carriage, a roller therein, key operated type, means for turning said roller from a base line to another base line, means for turning said roller in either direction from a base line position to receive an imprint in a predetermined position above or below said base line, said means also normally determining the color of said imprint, color furnishing means, and means for rendering either the positioning function or the color determining function inoperative while retaining the other of said functions.

In testimony whereof, I have signed my name to this specification.

GUY E. ETHERTON.